United States Patent
Smith

(10) Patent No.: US 8,594,447 B2
(45) Date of Patent: Nov. 26, 2013

(54) METHOD OF ESTIMATING BLUR KERNEL FROM EDGE PROFILES IN A BLURRY IMAGE

(75) Inventor: Leslie N Smith, Baltimore, MD (US)

(73) Assignee: The United States of America, as represented by the Secretary of the Navy, Washington, DC (US)

(*) Notice: Subject to any disclaimer, the term of this patent is extended or adjusted under 35 U.S.C. 154(b) by 210 days.

(21) Appl. No.: 13/336,030

(22) Filed: Dec. 23, 2011

(65) Prior Publication Data

US 2013/0163882 A1 Jun. 27, 2013

(51) Int. Cl.
G06K 9/40 (2006.01)
G06K 9/48 (2006.01)

(52) U.S. Cl.
USPC .......................................... 382/255; 382/199

(58) Field of Classification Search
None
See application file for complete search history.

(56) References Cited

U.S. PATENT DOCUMENTS

| | | | | |
|---|---|---|---|---|
| 2006/0093234 | A1* | 5/2006 | Silverstein | 382/255 |
| 2009/0190851 | A1* | 7/2009 | Chien et al. | 382/255 |
| 2009/0316995 | A1* | 12/2009 | Szeliski et al. | 382/199 |
| 2010/0202667 | A1* | 8/2010 | Ren et al. | 382/117 |
| 2011/0102642 | A1* | 5/2011 | Wang et al. | 348/241 |

OTHER PUBLICATIONS

R. Fergus et al., "Removing camera shake from a single photograph", SIGGRAPH, 2006.
Taeg S. Cho, Sylvain Paris, Berthhold K.P. Horn, William T. Freeman, "Blur kernel estimation using the Radon transform", IEEE Computer Society Conference on Computer Vision and Pattern Recognition, CVPR'11, 2011.
N. Joshi, R. Szeliski, and D. Kriegman, "PSF estimation using sharp edge prediction", IEEE Computer Society Conference on Computer Vision and Pattern Recognition, CVPR '08, 2008.
A. Levin et al., "Image and depth from a conventional camera with a coded aperture", SIGGRAPH, 2007.

* cited by examiner

Primary Examiner — Bhavesh Mehta
Assistant Examiner — David F Dunphy
(74) Attorney, Agent, or Firm — US Naval Research Laboratory; Suresh Koshy

(57) ABSTRACT

A method of deblurring a two-dimensional, blurred image. An edge within the blurred image is detected, and an edge profile of the blurred image is extracted. A length of the edge profile is determined, and a blur kernel size is estimated based thereon. A quantile function is applied to the edge profile, thereby generating quantile function output. A linearity test is performed on the quantile function output, thereby obtaining a preliminary linearity metric. Another quantile function is selected and the applying a quantile function to the edge profile, thereby generating quantile function output, and the performing a linearity test on the quantile function output, thereby obtaining a preliminary linearity metric, is iteratively repeated until a best linearity metric, a best quantile function, and a best quantile function output are determined. A slope of the best quantile function output is determined, and a blurring parameter is determined based thereon. A blur kernel is estimated based on the blurring parameter and the blur kernel size. A sharp image is resolved using the blur kernel.

5 Claims, 3 Drawing Sheets

Intensity Step Edge

Blur kernel

Edge profile

METHOD OF ESTIMATING BLUR KERNEL FROM EDGE PROFILES IN A BLURRY IMAGE

FIELD OF THE INVENTION

The invention relates generally to a method of de-blurring an image, and more particularly to a method of de-blurring an image using analytical computations.

BACKGROUND OF THE INVENTION

Blurry and noisy imagery is a ubiquitous problem for cameras and sensors across the spectrum of applications, including consumer photography, surveillance, computer vision, remote sensing, medical, and astronomical imaging. Simple methods to obtain sharp imagery are a valuable asset to all of these applications.

Although there are many sources of image blurring, blurring can be modeled by a single blur kernel, which is also called a point spread function ("PSP"). An equation for describing the observed blurry and noisy image as a function of the underlying sharp image is $$b = h \otimes i + n, \quad (1)$$

where b is the observed blurry image, h is the blur kernel, $\otimes$ is a convolution, i is the sharp image, and n is noise.

As shown, by way of example, in FIGS. 1A-1C, step edges in the real-world are convolved with a blur kernel to produce the blurry edge profiles seen in imagery. FIGS. 1A, 1B, and 1C are pictorial representations of an illustrative step edge, an illustrative blur kernel h for Eq. (1), and an illustrative edge profile, respectively. It is reasonable to assume the edges in the real, continuous scene being imaged are step edges of discontinuous intensity, such as shown in FIG. 1A. However, what is observed is a blurry image containing edge intensity profiles such as shown in FIG. IC.

In the overwhelming majority of real-world situations, only the blurry image is available. Solving for the sharp image is an ill-posed problem because theoretically there can be an infinite set of blur kernel and sharp image pairs that produce the blurry image. Therefore, knowing the blur kernel permits one to resolve the sharp image from the blurry image.

One solution is to use standard models for the PSF, such as a linear blur kernel for motion blurring, a circular PSF for defocus, and a Gaussian PSF for atmospheric blur. In addition to choosing a functional form, one must guess at the parameters or perform parametting. The edge profile method removes the guesswork and offers a way to quickly obtain a functional form, support size, and parameter values.

There are many PSF estimation methods in the literature. Fergus et al. describes one of the more accurate methods for estimating the blur kernel but it is also one of the most computationally demanding methods. (R. Fergus et al., "Removing camera shake from a single photograph", SIGGRAPH, 2006, incorporated herein by reference). Their paper shows that a kernel can be estimated for blur due to camera shake by using natural image statistics together with a variational Bayes inference algorithm. Their algorithm has been demonstrated to work well in a number of cases. However, even for small images or when Fergus et al.'s method uses only a portion of an image, the solution is highly computationally intensive.

Cho et al. present a method for estimating the PSF using the same assumption of step edges before blurring. (Taeg S. Cho, Sylvain Paris, Berthold K. P. Horn, William T. Freeman, "Blur kernel estimation using the Radon transform", IEEE Computer Society Conference on Computer Vision and Pattern Recognition, CVPR'11, 2011, incorporated herein by reference). These authors use techniques of image reconstruction from projections for estimating the blur kernel. Their insight is that a line integral of the blur kernel can be considered as a convolution of the kernel with an image of an ideal line. They use the inverse Radon transform, which is used in image reconstruction, to reconstruct the PSF. However, in its current implementation the user must provide the edge profile length, which requires a parameter space search since this parameter value affects results. They also present a Maximum a Posteriori ("MAP") method that incorporates the Radon transform as a prior to help solve for both the kernel and image. Their method is slow and is actually an iterative blind deconvolution technique, rather than a blur kernel estimation. Similarly, the edge profile method can be used as a prior within the MAP methodology.

Joshi, et al. detect edges in a blurry image and estimate the PSF under the assumption of a step edge before blurring; they use an iterative MAP approach for the blur kernel. (N. Joshi, R. Szeliski, and D. Kriegman, "PSF estimation using sharp edge prediction", IEEE Computer Society Conference on Computer Vision and Pattern Recognition, CVPR'08, 2008, incorporated herein by reference). Furthermore, they strive for a super-resolved blur kernel.

Much recent research in solving the image deblurring/restoration problem is in the area of blind deconvolution. Blind deconvolution attempts to iteratively solve for both the PSF and the sharp image from a blurry image by incorporating general knowledge of both the PSF and sharp image into an error function. These iterative methods are general, but complex and computationally expensive.

Non-blind deconvolution methods solve for the sharp image assuming an accurate blur kernel is known. Hence, methods of accurately estimating the blur kernel are required in order to provide input for the non-blind deconvolution methods.

Levin et al. describe a regularization technique using a sparse, natural image prior. (A. Levin et al., "Image and depth from a conventional camera with a coded aperture", SIGGRAPH, 2007, incorporated herein by reference). This sparse method encourages the majority of image pixels to be piecewise smooth.

BRIEF SUMMARY OF THE INVENTION

Applicant determined that the milk of a blurry edge in an image is equivalent to the statistical cumulative distribution function, which fides the underlying statistical probability density functional form. Similarly, in some circumstances, the edge profile can be used to find an approximate blur kernel that represents the blurring of the scene in an image.

Applicant recognized the utility of the following statistical methods for data analysis. First, probability plot correlation coefficient plots can be used to select the blurring functional form or model that best matches the profiles of the blurred edges in the image. Second, probability plots eliminate the search over the parameter space or the typical parameter fitting. The slope of a line or of the linear least squares fit determines the model parameters. Third, edges can be compared, such as done with quantile-quantile plots or by global maps of the parameters, to determine the necessity of anisoplanatic (i.e., spatially varying) or asymmetric blurring (e.g., caused by linear camera motion) functions.

The benefits from using these statistical methods for obtaining an image's blur kernel including the following. First, embodiments of the instant invention, for instance, include a non-iterative method to estimate the PSP model for an image and its parameters. The blur kernel incorporates blur from all sources, including factors inherent in the imaging system; embodiments of the invention, for instance, can optionally be used to estimate in real-time the blur kernel of each frame of a video. Second, an approximate kernel can provide intuitive insights, such as the blur spatial variation, or can be used to initialize more complex PSF estimation methods. Third, embodiments of the invention, for instance, rather than a user, estimate the blur kernel support size and parameter values.

An embodiment of the invention includes a method of deblurring an image. A two-dimensional, blurred image comprising a plurality of pixels having a plurality of intensity values is provided. An edge within the blurred image is detected. An edge profile of the blurred image is extracted based on the detected edge. A length of the edge profile is determined. A blur kernel size is estimated based on the length of the edge profile. Intensities of the extracted edge profile are scaled between 0 and 1. A quantile function is applied to the edge profile, thereby generating quantile function output. A linearity test is performed on the quantile function output, thereby obtaining a preliminary linearity metric. Another quantile function is selected and the applying a quantile function to the edge profile, thereby generating quantile function output, and the performing a linearity test on the quantile function output, thereby obtaining a preliminary linearity metric, is iteratively repeated until a best linearity metric, a best quantile function, and a best quantile function output are determined. A slope of the best quantile function output is determined. A blurring parameter is determined based on the slope. A blur kernel is estimated based on the blurring parameter and the blur kernel size. A sharp image is resolved from the blurred image using the blur kernel.

Optionally, the quantile function and the another quantile function each comprise a Gaussian function, a Uniform function, a Triangular function, a Logistic function, a Cauchy function, or a Tukey lambda family of distribution functions. Optionally, the quantile function and the another quantile function correspond to respective lambda parameter values for the Tukey lambda family of distributions.

Optionally, the blur kernel comprises one of a symmetric, asymmetric, isoplanatic, and anisoplanatic blur kernel.

Optionally, resolving a sharp image from the blurred image using the blur kernel includes using non-blind image deconvolution.

DETAILED DESCRIPTION OF THE INVENTION

Figures 1A, 1B, 1C:
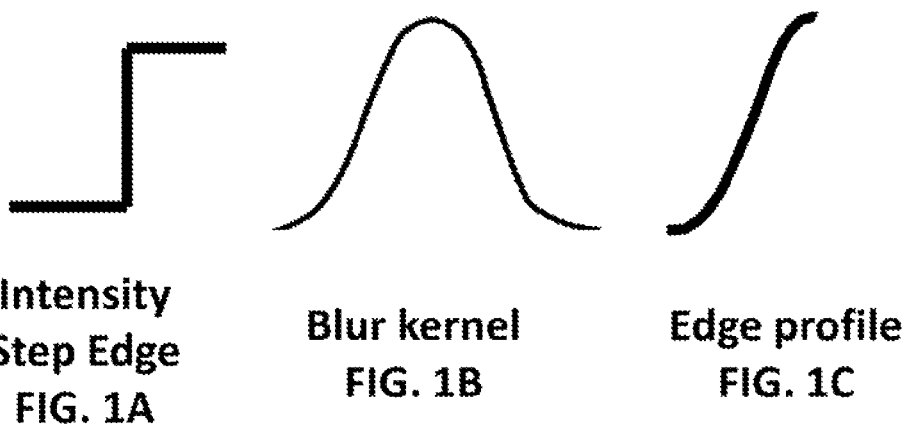
FIGS. 1A, 1B, and 1C are graphs of an illustrative step edge, an illustrative blur kernel, and a corresponding illustrative edge profile for an illustrative blurry image, respectively.

For edification purposes, it will be helpful to explain the statistical methods to be applied in one or more embodiments of the instant invention to the problem of estimating a blur kernel. These statistical methods are based on the relationships between probability density functions, cumulative distribution functions, and quantile functions. The edge intensity profile is equivalent to the cumulative distribution function.

The first step is to determine the statistical model that best fits the data. Probability plot correlation coefficient ("PPCC") plots allow one to select the blurring functional form that best matches the files of the blurred edges in the image. Given the functional form, the next step is to determine the governing parameters. The slope and intersection of a linear least squares ("LS") fit to the quantile function values in a probability plot determines the parameters without necessitating a search the parameter space. The slope and the intersection of the LS fit to the quantile function values are then used to obtain the edge profile.

For an ordered set of data $y_i$, for i=1 to n, the quantile fraction is $p_i=(i-0.5)/n$ and the quantile function is equal to $y_i$. A quantile-quantile ("Q-Q") plot is constructed by sorting each of two datasets from smallest to largest and then plotting them against each other. In the case of a different number of values in each dataset, the dataset with the greater number of values is interpolated to the quantile fraction of the smaller dataset.

Sorting is not necessary when comparing edge profiles because of the basic assumption that the edge intensity profile resembles the cdf. So, a Q-Q plot is simply a plot against each other of the quantile function evaluation of each pixel in the edge profile of two different edges. When a different number of pixels are taken from the two edges, interpolation can be performed.

The probability plot, which is also called a theoretical quantile-quantile plot, is a graphical technique for assessing whether a dataset follows a given distribution. This is a Q-Q plot where one of the quantile functions is the inverse of the theoretical cdf. The probability plot compares the distribution of the data to a theoretical distribution function, and the data should form a straight line if it conforms to the function and depart from a straight line if not.

Consider the profile of the edge to be the empirical cumulative distribution function of the data and compare it to theoretical cdfs in a search for the best functional form and parameters. The governing model could be found by minimization of the least squares error between the edge profile and the theoretical cdfs but this would require a search of the parameter space. Using the quantile function eliminates this search, and the parameters are easily found as the slope and intercept of a single linear least squares fit. A single theoretical quantile-quantile plot compares a set of data, not just to one theoretical distribution, but simultaneously to a whole family of distributions with different locations and spreads. In essence, the linearity of the quantile function values can be used as a measure of the appropriateness of the functional form. In addition, the quantile function transforms the curved edge profile to a straight line where a closed form linear LS fit is quick to compute.

Since the data will fall on a straight line if the underlying model is correct, a measure of linearity of the probability plot indicates the appropriateness of a functional form for a blur kernel. The Pearson product-moment correlation-coefficient is a measure of linearity and is often used in probability plot correlation coefficient ("PPCC") plots. It is given by:

$$CC = \frac{\sum_i (x_i - \bar{x})(y_i - \bar{y})}{\left[\sum_i (x_i - \bar{x})^2 \sum_i (y_i - \bar{y})^2\right]^{1/2}} \quad (2)$$

where CC is the correlation coefficient, $\bar{x}$ and $\bar{y}$ are averages of datasets $x_i$ and $y_i$. In the PPCC plots, $x_i$ is replaced by the theoretical quantile function, such as those in Table 1. Table 1 shows common probability distribution functions ("pdf") that may be considered as functional forms for a blur kernel. Associated cumulative distribution functions ("cdf") and quantile functions ("qf") are also shown.

TABLE I

| Distribution | pdf / PSF | cdf | qf |
|---|---|---|---|
| Gaussian | $\frac{1}{\sqrt{2\pi}\,\sigma}\exp\left[-\left(\frac{x-\mu}{\sqrt{2}\,\sigma}\right)^2\right]$ | $\frac{1}{2}\left[1+\mathrm{erf}\left(\frac{x-\mu}{\sqrt{2}\,\sigma}\right)\right]$ | $\mu + \sigma\sqrt{2}\,\mathrm{erf}^{-1}(2p-1)$ |
| Uniform | $\frac{1}{b-a}$ for $a \le x \le b$ | $\frac{x-a}{b-a}$ for $a \le x \le b$ | $a + p(b-a)$ for $0 \le p \le 1$ |
| Triangular | $\begin{cases}\frac{2(x-a)}{(b-a)(c-a)} & \text{for } a \le x \le c \\ \frac{2(b-x)}{(b-a)(c-a)} & \text{for } c \le x \le b\end{cases}$ | $\begin{cases}\frac{(x-a)^2}{(b-a)(c-a)} \\ 1 - \frac{(b-x)^2}{(b-a)(c-a)}\end{cases}$ | $\begin{cases}a + \sqrt{(b-a)(c-a)p} \\ b - \sqrt{(b-a)(c-a)(1-p)}\end{cases}$ |
| Logistic | $\frac{\exp[-(x-\mu)/\sigma]}{\sigma(1+\exp[-(x-\mu)/\sigma])^2}$ | $\frac{1}{1+\exp[-(x-\mu)/\sigma]}$ | $\mu + \sigma\ln\left(\frac{p}{1-p}\right)$ |
| Cauchy | $(\pi\sigma)^{-1}[1+((x-\mu)/\sigma)^2])^{-1}$ | $\frac{1}{\pi}\arctan((x-\mu)/\sigma) + \frac{1}{2}$ | $\mu + \sigma\tan\left[\pi\left(p-\frac{1}{2}\right)\right]$ |
| Tukey $\lambda$ | Computed numerically | Computed numerically | $\begin{cases}\log(p)-\log(1-p) & \text{if } \lambda=0 \\ [p^\lambda-(1-p)^\lambda]/\lambda & \text{otherwise}\end{cases}$ |

Some probability distributions are not a single distribution, but are a family of distributions due to one or more shape parameters. These distributions are particularly useful in modeling applications because they are flexible enough to model a variety of datasets. Construction of the PPCC plot is done by plotting the linearity measure, such as CC in Equation (2), as a function of the shape parameter. The maximum value corresponds to the best value for the shape parameter. The goal is to obtain a functional form that best matches the blurry edge profile's shape.

Referring to Table 1, the Gaussian function is one of the most common functions used, both for the pdf and the PSF. The Gaussian pdf, cdf and of are given in Table 1 where $\mu$ is the mean, $\sigma$ is the standard deviation and erf is the error function. Searching the parameter space is eliminated because the mean and standard deviation are easily determined from the intercept and slope of the probability plot. Hence, if it is known for a blurry image that the blur kernel is a Gaussian function, it is only necessary to apply the $\mathrm{erf}^{-1}$ function to the edge profile to determine $\sigma$.

Similarly, if it is known that the blur kernel's functional form matches any of the single distributions functions listed in Table 1, their quantile function will help determine the parameters for these blur kernels.

It is desirable to compare the blurry edge profile to a family of distributions to find the most appropriate functional form. By plotting the correlation-coefficient for various values of the functional shape parameter $\lambda$, the value of $\lambda$ that best matches the edge profile can be taken as the proper functional form. The last entry in Table 1 is the Tukey lambda distribution, which is a family of distributions governed by a shape variable $\lambda$. For the Tukey lambda distribution, if $\lambda=-1$: distribution is approximately Cauchy
$\lambda=0$: distribution is exactly logistic
$\lambda=0.14$: distribution is approximately normal
$\lambda=0.5$: distribution is U-shaped
$\lambda=1$: distribution is exactly uniform In other words, the value for $\lambda$ in a PPCC plot that produces the maximum value indicates if the best fit functional form is one of these distributions. The Tukey lambda distribution family is advantageously used in one or more embodiments of the instant invention because it models the most common functions used for blur functions. One of ordinary skill in the art will recognize that there are alternative distribution families that are appropriate depending on their application. Alternatively, one can match the edge profile with combinations of quantile functions.

Figure 2:
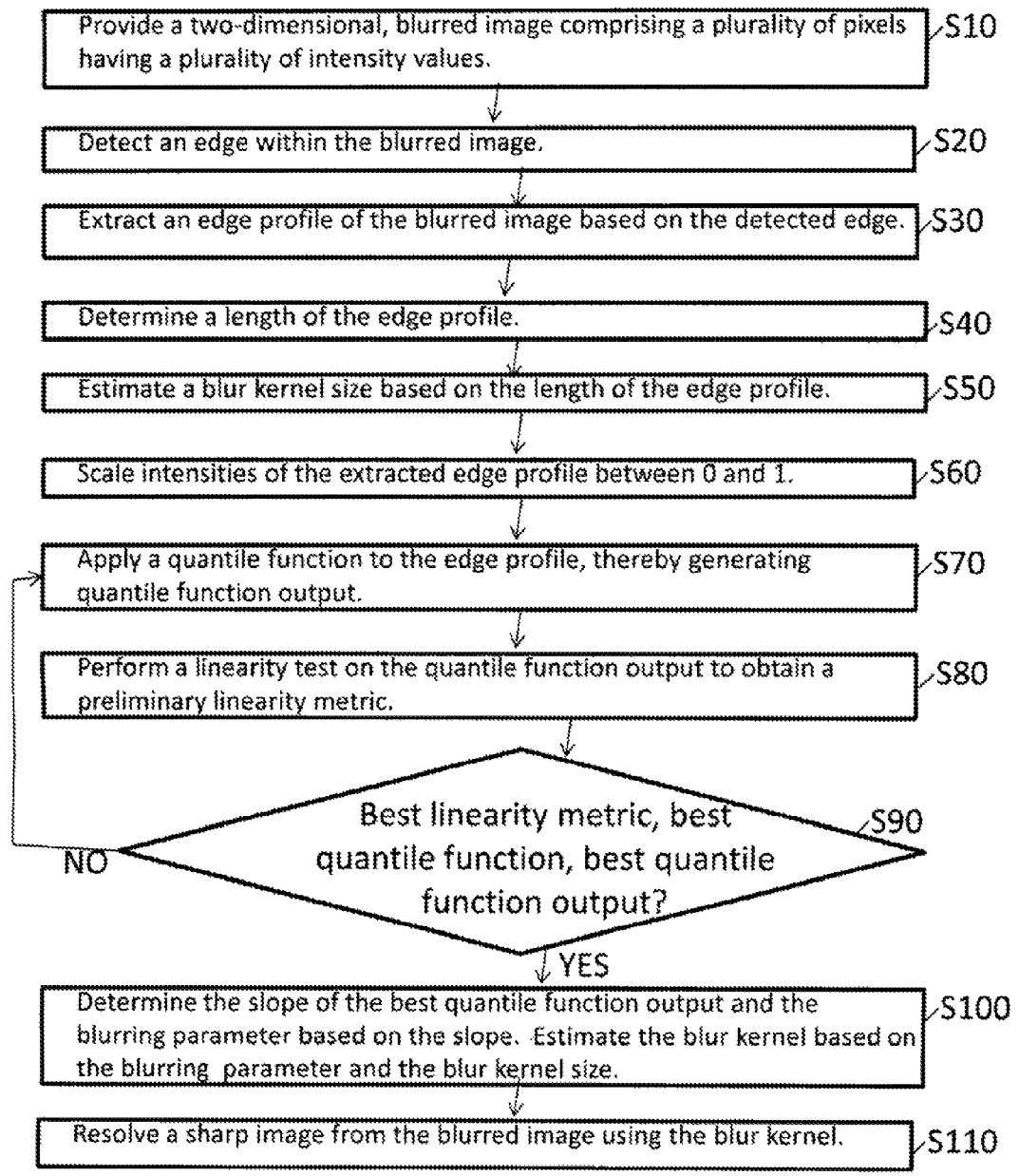
FIG. 2 is an illustrative flowchart of a method embodiment of the instant invention.

An embodiment of the invention includes a method of deblurring an image, and is described by way of example with reference to FIG. 2. A two-dimensional, blurred image comprising a plurality of pixels having a plurality of intensity values is provided, as shown in STEP 10. An edge within the blurred image is detected, as shown in STEP 20. An edge profile of the blurred image is extracted based on the detected edge, as shown in STEP 30. A length of the edge profile is determined, as shown in STEP 40. A blur kernel size is estimated based on the length of the edge profile, as shown in STEP 50. Intensities of the extracted edge profile are scaled between 0 and 1, as shown in STEP 60. A quantile function is applied to the edge profile, thereby generating quantile function output, as shown in STEP 70. A linearity test is performed on the quantile function output, thereby obtaining a preliminary linearity metric, as shown in STEP 80. Another quantile function is selected and the applying a quantile function to the edge profile, thereby generating quantile function output, and the performing a linearity test on the quantile function output, thereby obtaining a preliminary linearity metric, is iteratively repeated until a best linearity metric, a best quantile function, and a best quantile function output are determined, as shown in STEP 90. The linearity metric with the maximum value, i.e., the best linearity metric, points to a single best quantile function, and by extension a single best quantile function output. A slope of the best quantile function output is determined, as shown in STEP 100. A blurring parameter is determined based on the slope, as shown in STEP 100. A blur kernel is estimated based on the blurring parameter and the blur kernel size, as shown in STEP 100. A sharp image is resolved from the blurred image using the blur kernel, as shown in STEP 110.

Another method embodiment of instant invention is described as follows. This method embodiment falls in the gap between assuming a standard model for the PSF and the deconvolution methods. Using this method embodiment, for little more than "back of the envelope", analytical computations, one obtains an approximate blur kernel that works well for some real-world imagery. How to obtain an estimate of the blur kernel by using the concepts behind the statistical tools of probability plots, probability plot correlation coefficient (PPM plots, and quantile-quantile (Q-Q) plots is described below. These described method steps can be used to estimate the PSF support size and functional form that caused the blurring in an image and then the parameters can be obtained without searching the parameter space.

Figure 3:
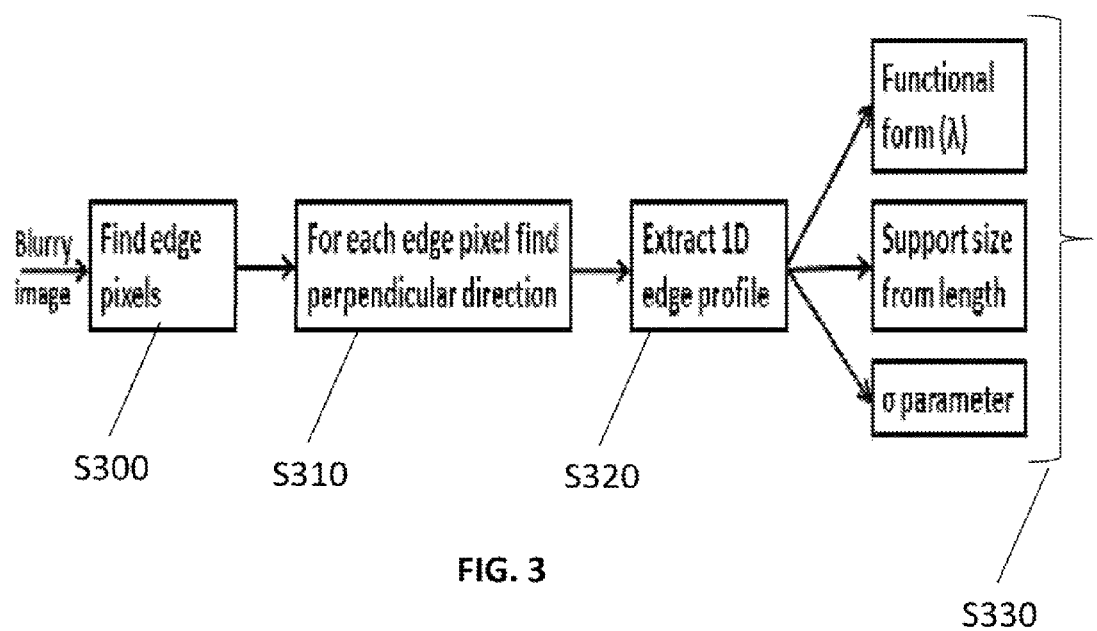
FIG. 3 is another illustrative flowchart of blur kernel modeling according to a method embodiment of the instant invention.

FIG. 3 shows, by way of example, a top level flowchart of a blur kernel modeling method consistent with an embodiment of the invention. As illustrated in FIG. 3, this method starts with a blurry image and finds appropriate edge pixels, in indicated Step 300. Appropriate edge pixels separate relatively high contrast, homogeneous regions. As in indicated in Step 310, a method of automatically qualifying edge pixels, determining the direction perpendicular to the edge, and assessing if the surrounding regions are locally homogeneous is described below. As FIG. 3 shows in Step 320, the next step is to extract the 1-D edge profile that transverses from one homogeneous region to the other homogeneous region. Once the edge profile has been selected, the blur function model and parameters that best fit. the data can found, as indicated in Step 330.

Edge profiles can be manually extracted by the user or performed automatically by the system. Manual extraction is more robust to noise than automatic methods but automatic methods are necessary for independent systems. Hence, embodiments of the instant invention include ways of automatically extracting an edge intensity profile.

Automatically extracting edge profiles is done by selecting appropriate edge pixels, determining the perpendicular direction, adding endpoints for the profile. There are several requirements for an edge pixel to produce a reasonable result. The edge should separate locally homogeneous regions that are of signficantly different intensities. If the contrast is not significant, the estimation of the blur kernel will be more sensitive to noise distortion. If the regions on both sides of the edge are not homogeneous, the image details will distort the result.

An illustrative method according to the instant invention to automatically extract edge profiles in an image is as follows.
1: Perform an edge detection.
2: Compute a derivative map.
3: Compute a noise threshold from the derivative map.
4: for each detected edge pixel do
5. Compute an energy in each of four directions.
6. Compute the perpendicular direction.
7. Determine the edge profile length.
8. Test the edge profile to reject or accept.
9. Solve for parameters.
10: end for Standard edge detection methods are consistent with the instant invention. For example, Matlab's implementation of Canny's method was used with larger than default thresholds in order to limit the edge pixels to high contrast edges. A derivative map is a map of the differences in intensity between neighboring pixel; that is, it is equal to $|H|+|V|$ where H is a horizon filter and V a vertical filter. For example, H could be the filter $(-1\ 1)$ and $V=H^T$. The noise threshold was computed from homogeneous regions, which are regions in the derivative map with locally small values.

There are several standard ways to determine edge direction, such as by structure tensors. For example, an energy is computed in each of four directions from an edge pixel; horizontal, vertical, and the two diagonal. This is done by summing the derivative map values stepping away both ways from the edge pixel in each of these four directions and stopping when the derivative values fall under the noise threshold. The edge direction is determined as the direction with the greatest energy and the perpendicular direction is 90 degrees from edge direction.

How to determine the proper edge profile length is described as follows by way of example. An illustrative method for estimating the endpoint pixel is to compare intensities differences (i.e., average gradient) between three locations, for example, at the edge pixel, at a user inputted maximum length of the profile, and halfway between. Then, it is determined from the average gradient which half is likely to contain the endpoint and this bisection procedure is repeated within the chosen half until the endpoint pixel is determined. If the edge profile is accepted, the parameters are computed by the method presented below.

It is straightforward using the edge profile for determining the best blur function and resolving its parameters. As shown in FIG. 3, the edge profile is input to both the PPCC plot and the probability plot computation. If the edge profile matches a cdf profile, such as in Table 1, then substituting the edge intensity values into the corresponding quantile function should yield a straight line.

The algorithm for the PPCC plot is given by:
1: Linearly transform the edge profile.
2 for $-1 \leq \lambda \leq 1$ do
3: Compute the quantile function values.
4: Compute a linear least squares fit.
5: Compare of to LS line via equation 2.
6: end for
7: Plot the correlation coefficient versus $\lambda$.

Because a cdf function is always in the range from 0 to 1, a linear transform of the edge profile values to this range is required. The edge profile is actually transformed to the range slightly smaller than 0 to 1 (e.g., from 0.01/n to 1.0–0.01/n, where n is the number of pixels in the edge profile) because reducing the endpoints slightly prevents infinity values at 0 and 1. The quantile function values are computed for each pixel in the edge profile. Then the results of the quantile function are compared using Equation (2). This correlation coefficient ("CC") value is then plotted against the value of shape parameter $\lambda$ and the maximum CC value indicates the best blur function.

Once the functional form is chosen, the method for obtaining the scale parameter $\sigma$ is similar to the PPCC plot method. It is given by:
1: Linearly transform the edge profile.
2: Take the quantile function for each pixel on this line.
3: Do a linear least squares fit.
4: $\sigma = 1/\text{slope}$
5: if horizontal or vertical profile then
6: $\sigma = \sigma/2^{0.5}$
7: end if After performing the linear least squares fit, a is obtained as the inverse of the slope of this line. The division by the square root of two is necessary because diagonal distances differ from horizontal or vertical distances by the square root of two.

Most PSF estimation and blind deconvolution methods require as input an estimate of the size of the blur kernel. It is easily shown that the length of the edge profiles provides an estimate of the PSF support size. This can be seen by imagining a 1-D step edge that is convolved with a square wave of length X. The result is a ramp edge of length X. Hence, if the length of the ramp edge profile is X, the support size of the underlying blur kernel is also X. Another viewpoint is that the extent of the effects of a blur kernel is reflected in the length of the edge profile.

In practice, the edge profile lengths mostly fall into a range of values. A good choice for PSF support size tends to be close to the top end of the range. Choosing a reasonable PSF size is critical for uniform blur kernels. On the other hand, a Gaussian PSF is governed more by $\sigma$ and the size need only be large enough to include significant kernel values (rule of thumb is a size of about $4\sigma$). However, using the edge profile to guide PSF size prevents one from choosing too large a size and reduces the amount of needless computation during blur kernel estimation or deconvolution.

Image deblurring is a building block for many applications, such as atmospheric turbulence mitigation. For example, one or more embodiments of the invention are suited for the deblurring step of standard super-resolution methods because they define a continuous function for the blur kernel, and hence can be defined at any desirable resolution.

Exemplary embodiments for implementing method embodiments of the invention are described by way of non-limiting example as follows. The method embodiments are embodied, for instance, in a software program that operates in a standard processor or in a standard computing operating environment, optionally operably connected to a standard imaging device, such as a standard camera. The computer operating environment, for example, includes a desktop computer, a laptop computer, a mobile computer, a server computer, and the like, in which embodiments of the invention may be practiced. A brief, general description of a suitable computing environment in which embodiments of the invention may be implemented is described as follows. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

An illustrative operating environment for embodiments of the invention will be described. A computer comprises a general purpose desktop, laptop, handheld, mobile or other type of computer (computing device) capable of executing one or more application programs. The computer includes at least one central processing unit ("CPU"), a system memory, including a random access memory ("RAM") and a read-only memory ("ROM"), and a system bus that couples the memory to the CPU. A basic input/output system containing the basic routines that help to transfer information between elements within the computer, such as during startup, is stored in the ROM. The computer further includes a mass storage device for storing an operating system, application programs, and other program modules.

The mass storage device is connected to the CPU through a mass storage controller connected to the bus. The mass storage device and its associated computer-readable media provide non-volatile storage for the computer. Although the description of computer-readable media contained herein refers to a mass storage device, such as a hard disk or CD-ROM drive, it should be appreciated by those skilled in the art that computer-readable media can be any available tangible physical media that can be accessed or utilized by the computer.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, and magnetic disk storage or other magnetic storage devices.

According to various embodiments of the invention, the computer may operate in a networked environment using logical connections to remote computers through a network, such as a local network, the Internet, etc. for example. The computer may connect to the network through a network interface unit connected to the bus. It should be appreciated that the network interface unit may also be utilized to connect to other types of networks and remote computing systems. The computer may also include an input/output controller for receiving and processing input from a number of other devices, including a keyboard, mouse, or other device. Similarly, an input/output controller may provide output to a display screen, a printer, or other type of output device.

As mentioned briefly above, a number of program modules and data files may be stored in the mass storage device and RAM of the computer, including an operating system suitable for controlling the operation of a networked personal computer. The mass storage device and RAM may also store one or more program modules. In particular, the mass storage device and the RAM may store application programs, such as a software application, for example, a word processing application, a spreadsheet application, a slide presentation application, a database application, etc.

It should be appreciated that various embodiments of the present invention may be implemented as a sequence of computer implemented acts or program modules running on a computing system and/or as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as described herein.

Because numerous modifications and variations of the above-described invention will occur to those of ordinary skill in the art, it is not desired to limit the invention to the exact construction and operation illustrated and described. Accordingly, all suitable modifications and equivalents may be resorted to, falling within the scope of the invention.

What is claimed as new and desired to be protected by Letters Patent of the U.S. is:

1. A method comprising:
   providing a two-dimensional, blurred image comprising a plurality of pixels having a plurality of intensity values;
   detecting an edge within the blurred image;
   extracting an edge profile of the blurred image based on the detected edge;
   determining a length of the edge profile;
   estimating a blur kernel size based on the length of the edge profile;
   scaling intensities of the extracted edge profile between 0 and 1;
   applying a quantile function to the edge profile, thereby generating quantile function output;
   performing a linearity test on the quantile function output, thereby obtaining a preliminary linearity metric;
   selecting another quantile function and iteratively repeating said applying a quantile function to the edge profile, thereby generating quantile function output, and said performing a linearity test on the quantile function output, thereby obtaining a preliminary linearity metric, until a best linearity metric, a best quantile function, and a best quantile function output are determined;
   determining a slope of the best quantile function output;
   determining a blurring parameter based on the slope;
   estimating a blur kernel based on the blurring parameter and the blur kernel size; and
   resolving a sharp image from the blurred image using the blur kernel.

2. The method according to claim 1, wherein the quantile function and the another quantile function each comprise one of a Gaussian function, a Uniform function, a Triangular function, a Logistic function, a Cauchy function, and a Tukey lambda family of distribution functions.

3. The method according to claim 2, wherein the quantile function and the another quantile function correspond to respective lambda parameter values for the Tukey lambda family of distributions.

4. The method according to claim 1, wherein the blur kernel comprises one of a symmetric, asymmetric, isoplanatic, and anisoplanatic blur kernel.

5. The method according to claim 1, wherein said resolving a sharp image from the blurred image using the blur kernel comprises using non-blind image deconvolution.

* * * * *